US009366226B2

(12) United States Patent
Yan

(10) Patent No.: US 9,366,226 B2
(45) Date of Patent: *Jun. 14, 2016

(54) CIRCUIT WIND POWER SYSTEM AND METHOD FOR GENERATING ELECTRICITY USING THE SAME

(71) Applicant: Qiang Yan, Shanghai (CN)

(72) Inventor: Qiang Yan, Shanghai (CN)

(*) Notice: Subject to any disclaimer, the term of this patent is extended or adjusted under 35 U.S.C. 154(b) by 166 days.

This patent is subject to a terminal disclaimer.

(21) Appl. No.: 14/256,889

(22) Filed: Apr. 18, 2014

(65) Prior Publication Data

US 2015/0240781 A1    Aug. 27, 2015

(30) Foreign Application Priority Data

Feb. 24, 2014    (CN) .......................... 2014 1 0060821

(51) Int. Cl.
*F03D 5/04*    (2006.01)
(52) U.S. Cl.
CPC . *F03D 5/04* (2013.01); *Y02E 10/70* (2013.01); *Y02P 80/22* (2015.11)
(58) Field of Classification Search
CPC ............................... F03D 9/002; Y02E 10/70
USPC ...................................... 290/44, 55
See application file for complete search history.

(56) References Cited

U.S. PATENT DOCUMENTS

| 3,730,643 | A | * | 5/1973 | Davison | ............................. 416/8 |
| 4,163,905 | A | * | 8/1979 | Davison | ........................ 290/54 |
| 4,589,344 | A | * | 5/1986 | Davison | ........................... 104/24 |
| 4,859,146 | A | * | 8/1989 | Labrador | ........................... 416/8 |
| 6,672,522 | B2 | * | 1/2004 | Lee et al. | ........................ 290/55 |
| 7,780,411 | B2 | | 8/2010 | Yan | |
| 2004/0080166 | A1 | * | 4/2004 | Davidson | ........................ 290/55 |
| 2008/0157526 | A1 | * | 7/2008 | Davison et al. | .................... 290/3 |
| 2009/0008939 | A1 | * | 1/2009 | Pare et al. | ........................ 290/44 |
| 2009/0045634 | A1 | * | 2/2009 | Sane et al. | ........................ 290/55 |
| 2010/0117371 | A1 | | 5/2010 | Ippolito et al. | |
| 2010/0289264 | A1 | * | 11/2010 | Lee et al. | ........................ 290/44 |
| 2011/0018280 | A1 | * | 1/2011 | Mahaffy et al. | .................. 290/55 |
| 2011/0309634 | A1 | * | 12/2011 | Syrovy | ............................. 290/55 |
| 2012/0274076 | A1 | | 11/2012 | Kelaiditis et al. | |
| 2012/0326447 | A1 | * | 12/2012 | Rodway | ........................ 290/55 |

FOREIGN PATENT DOCUMENTS

| CN | 200610028267.7 | 12/2006 |
| CN | 200810108995.8 | 12/2009 |

* cited by examiner

*Primary Examiner* — Tulsidas C Patel
*Assistant Examiner* — Sean Gugger
(74) *Attorney, Agent, or Firm* — Mei & Mark LLP; Manni Li

(57) ABSTRACT

A wind power electricity generating system and its generation method, comprising a circuit frame, towers that support the circuit frame, a plurality of rails attached to the circuit frame, a plurality of interconnected trolleys, each trolley is connected with a blade whose blade rotation angle is adjustable, a plurality of generators, a plurality of positioning devices capable of sending and receiving signals deployed on the circuit frame, and a wireless servo signal transmission device capable of sending and receiving signals is deployed at each trolley. Current collectors are deployed at the trolley.

20 Claims, 14 Drawing Sheets

CIRCUIT WIND POWER SYSTEM AND METHOD FOR GENERATING ELECTRICITY USING THE SAME

CROSS-REFERENCE AND RELATED APPLICATION

The subject application claims priority on Chinese patent application No. CN 201410060821.4 filed on Feb. 24, 2014. The contents and subject matter of the Chinese priority application is incorporated herein by reference.

FIELD OF THE INVENTION

The present invention relates to wind power, and particularly to large wind power electricity generating system and method for generating the electricity power that is suitable for industrial application.

BACKGROUND OF THE INVENTION

Human being has invented various devices to use wind energy to generate electricity, and such devices can be divided into two categories based on the deployment of the rotating shaft: horizontal axis wind turbines which have horizontally deployed main shaft, and vertical axis wind turbines (VAWTs) which have vertically deployed main shaft.

Current VAWTs utilize blades of certain airfoil profile. As shown in FIG. 1, the blades 1 are usually connected to the vertical main shaft 2 via the radial arms 3, and the wind rotor is fixed on the top of a tower 4, and is able to rotate around the its center (i.e., the main shaft). As the wind rotor diameter increases, the length of the main shaft becomes longer, and the diameter of the main shaft becomes bigger, thus making manufacturing thereof difficult and costly. What's more, wind rotors with increased diameter also increases requirements on the height and strength of the tower. Although Chinese patent CN200810108995.8 discloses a VAWT with a hollow main shaft, or a truss structure main shaft, when the wind rotor diameter increases to a certain degree, the main shaft diameter will become too big and difficult to be manufactured, which hinders the upsizing of VAWTs—VAWTs of 300 kW and 500 kW may be the limit, letting alone much bigger VAWTs.

Further, for the current VAWTs with fixed blade setting angle (rotation angle), when the wind rotor rotates, the magnitude and direction of the torque on the blade are changing all the time based on the blade's position on the wind rotor rotation orbit. At certain positions, the torque is bigger and at other positions smaller; at certain positions, the torque is positive and at other positions negative. For large VAWTs, the diameter of wind rotor is increased, and the rotation speed of the wind rotor is lowered, the torque changes on the blade become more significant. Therefore, the wind rotor of the VAWT usually has lower aerodynamic efficiency as the ultimate torque output of the wind rotor is the resultant torque on all the blades. To improve the efficiency, the blade rotation angle must be adjusted in real time based on the blade's position on the wind rotor rotation orbit.

Blade rotation angle adjustment is usually done by providing a pivot at the center of blade ends, thus the blade is able to rotate and therefore adjust the blade rotation angle. However, the driving torque needed is closely related to the blade size, position of the pivot, wind direction and speed, and blade angle, etc. Therefore, in actual application, the blade angle shall be fixed to ensure stable output of the VAWT based on the specific conditions (e.g., under certain wind speed and direction).

Chinese Patent CN200610028267.7 discloses that a desirable wind rotor radius shall be 1.8 times to 4 times of the blade width (chord length). Based on the disclosure, for a wind rotor of 12 meter diameter, a suitable blade width is approximately 2 meters; for a wind rotor of 30 meter diameter, a suitable blade width is approximately 5 meters; for a wind rotor of 40 meter diameter, a suitable blade width is approximately 7 meters; and for a wind rotor of 50 meter diameter, a suitable blade width exceeds 8 meters. For a VAWT with a 50 meter diameter and a 50 meter length wind rotor, its output at 13 m/s is around 1 MW. However, such a wide structure (50 meter high and 50 meter wide) is difficult to be manufactured and transported, thus, hinders the commercialization of the turbine.

Further, current wind turbines are usually designed and manufactured to meet the planned capacity. The installation site and rated output are so limiting that the installation site and wind energy can not be used fully and efficiently. For example, wind turbines are typically manufactured with a rated capacity of 10 KW, 30 KW, 50 KW, or 100 KW independently. Manufacturing and assembly of parts for wind turbines of various capacities are different, so are the manufacturing requirements and techniques to be used. Therefore, they are hardly suitable for mass production.

SUMMARY OF THE INVENTION

The present invention overcomes the disadvantage of the prior wind system and provides a modular designed wind power system, which is ready for industrial mass production.

The present invention provides a wind power system comprising a circuit frame, towers that support the circuit frame, a plurality of rails attached to the circuit frame, a plurality of trolleys which are connected with each other, each trolley corresponds to and is connected with each blade whose blade rotation angle is adjustable, a plurality of generators, a plurality of positioning devices capable of sending and receiving signals are installed on the circuit frame, and a wireless servo signal transmission device capable of sending and receiving signals deployed at each trolley, current collectors installed at the trolley which is able to collect power supply, and an anemometer and wind vane.

In the present invention, the circuit frame may be of a unit module structure, and two unit modules may be connected via plugging. A plurality of modules may form the circuit frame with the designed shape.

In the present invention, the circuit frame may be designed to have arc segments, and the positioning devices may be deployed on the arc segments of the circuit frame.

In the present invention, the trolley is attached to the rails of the circuit frame and capable of moving on the rails of the circuit frame via rollers/sliders.

In the present invention, the rail is connected to the circuit frame through the arms, and the rail can be of any kind, e.g., maglev.

In the present invention, a plurality of rollers are on the trolley.

In the present invention, the trolleys are interconnected with a chain, and the generator may be fixed on the circuit frame. The generator has a gear fixed thereon, while the chain engages the gear that is fixed on rotor shaft of the generators to drive the generator. The trolleys are optionally connected with each other by a steel cable or another chain, which is in parallel to the chain that engages the gear for driving the rotor shaft of the generators.

In the present invention, the current collectors may be a pantograph or a slip ring that is deployed on the trolley, thereby receiving electricity from the power grid and thus may power the hydraulic drive system and the wireless servo signal transmission device of the trolley.

Positioning devices are provided at intervals (e.g., 10 degrees to 20 degrees) on the arc segments of the circuit frame. While the trolley passes the positioning device, the positions of trolleys on the arc segments can be determined. Based on the positions of trolleys on the arc segments, an optimal blade rotation angle is decided. It is known in the art how to determine the optimal rotation angles for the blades to maximize the efficiency of the device and adjust the rotation angle accordingly. For example, U.S. Pat. No. 7,780,411 depicts the adjustment of the rotation angles based on the arc portion of the frame, which description is incorporated herein by reference.

Alternatively, the circuit frame may have two tiers—the upper tier and the lower tier.

In the present invention, the blade is attached on the trolley with one blade on each trolley, and the rotation angle of the blade is adjustable. The blade may have the section of a symmetric aerofoil, airfoil with a convex surface and a concave surface, or airfoil with a convex surface and a flat surface. The interval between the neighboring trolleys is 2-8 times of the width of the blade.

In the present invention, the blade may consist of an upper blade and a lower blade, and the upper blade and the lower blade are connected via a pivot shaft. The pivot shaft is able to rotate, thus making the blade rotate.

In the present invention, the rotation angle of the blade is adjustable based on the position of the corresponding trolley on the circuit frame.

In the present invention, after the rotation angle of the blade is adjusted, the blade may be braked by the blade braking device, which comprises a brake caliper, braking disc, and a hydraulic drive system. The hydraulic drive system comprises oil tank, hydraulic pump, oil tube, and motor. Two separate hydraulic drive systems may be used for changing the blade rotation angle and braking the blade, respectively; alternatively, to reduce the weight and cost, it is preferably to use the same hydraulic drive system for both adjusting the blade rotation angle and braking the blade. The braking disc may be deployed on the pivot shaft.

The present invention further provides a method for generating wind power by using the wind power system of the present invention. For the wind energy system of the present invention, the circuit frame may have a plurality of rotation centers, and the shape of the circuit frame can be designed to cater to the installation site condition. The section of the circuit frame modules can be designed as needed. Every part of the system, including the circuit frame, towers, rails, trolleys, blades, central control system, combiner box, and inverters, etc., can be manufactured in the factory and assembled at the installation site. The servo signals are wirelessly sent and received by the wireless servo signal transmission device installed at each trolley. An anemometer and wind vane is deployed at a point along the axis of symmetry of the circuit frame, such as along the longitudinal axis of symmetry of the circuit frame as depicted in FIG. 2, for identifying the wind speed and direction. A central controller actively adjusts the blade rotation angle and brakes the blade as necessary, based on the blade's position on the circuit frame, wind speed and direction, generator output, etc.

The outputs of generators go to the combiner box, where the different AC input, with frequency, voltage, and current being adjusted, become a single DC output, and the combiner box sends the DC output to the inverter and eventually to the power grid.

The present invention provides a module design wind energy system that is ready for industrial mass production and particularly suitable for large scale electricity generation, and the shape of the system can be designed to adapt to the terrain of installation site.

Figure 1:
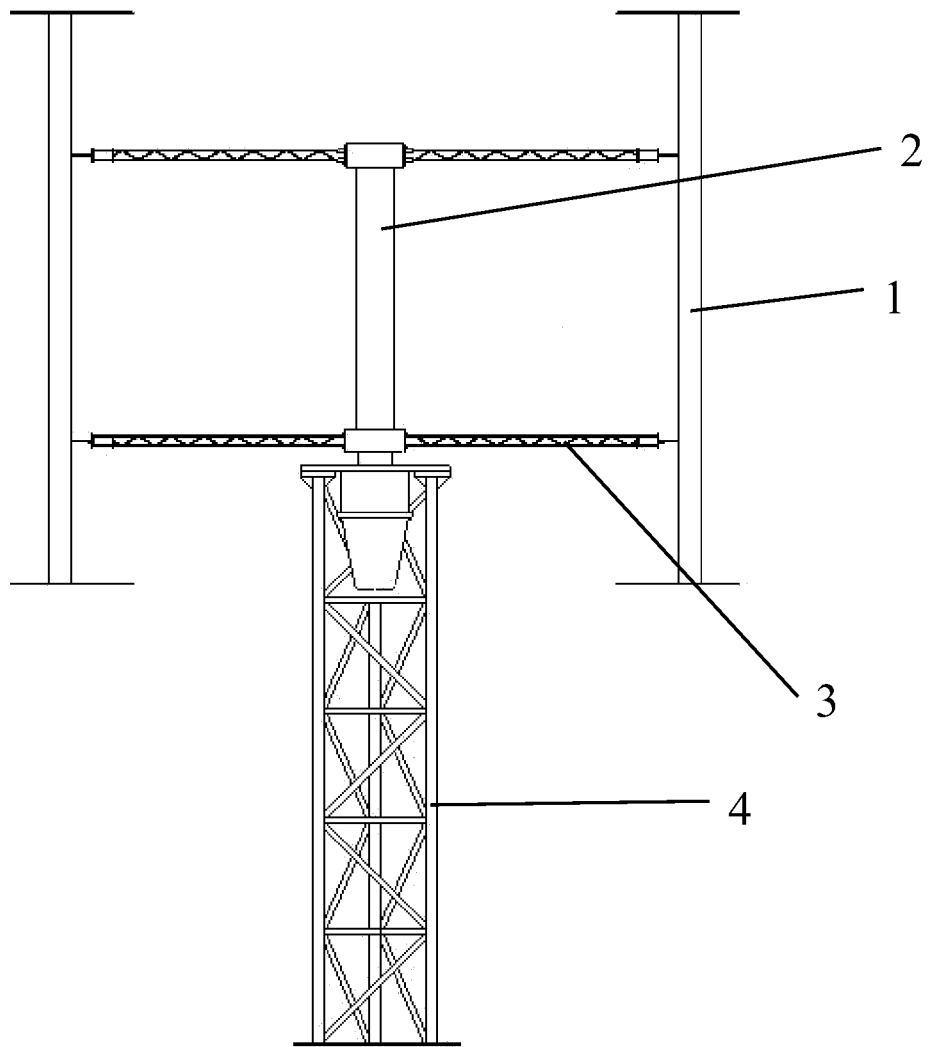
FIG. 1 shows the structure of the prior art VAWT.

The reference numbers used in the figures are as follows:

| | | |
|---|---|---|
| 1. blade (prior art); | 2. vertical main shaft (prior art); | 3. radial arm (prior art); |
| 4. tower(prior art); | 11. tower; | 22. circuit frame; |
| 31. trolley; | 32. rail; | 33. roller/sliders; |
| 34. arm; | 51. blade arm; | 53. pivot shaft; |
| 54. servo pushing rod; | 55. blade; | 55a. upper blade; |
| 55b. lower blade; | 56. blade rotation servo device; | |
| 57. hydraulic drive system; | | 58. brake caliper; |
| 59. braking disc; | 61. generator; | 62. gear; |
| 63. chain; | 64. steel cable or chain; | |
| 65. rotating shaft of generator; | 66. combiner box; | |

-continued 67. inverter;   71. positioning device (transmitters or receivers);
72. wireless servo signal transmission device;
81. current collector;   82. power grid;
91. anemometer and wind vane.

DETAILED DESCRIPTION OF THE INVENTION

In the present invention, as shown in FIGS. 2, 3, 7, and 9, the structure of the wind energy system of the present invention comprises a circuit frame 22, towers 11 that support the circuit frame 22, a plurality of rails 32 that are attached to the circuit frame 22, a plurality of trolleys 31 that are connected with each other, each trolley 31 corresponds to and is connected with each blade 55 whose blade rotation angle is adjustable, a plurality of generators 61, a plurality of positioning devices 71 capable of sending and receiving signals are deployed on the circuit frame 22, and a wireless servo signal transmission device 72 capable of sending and receiving signals is deployed at each trolley 31, current collectors 81 deployed at the trolley 31 which is able to collect power supply, and an anemometer and wind vane 91.

Figure 3:
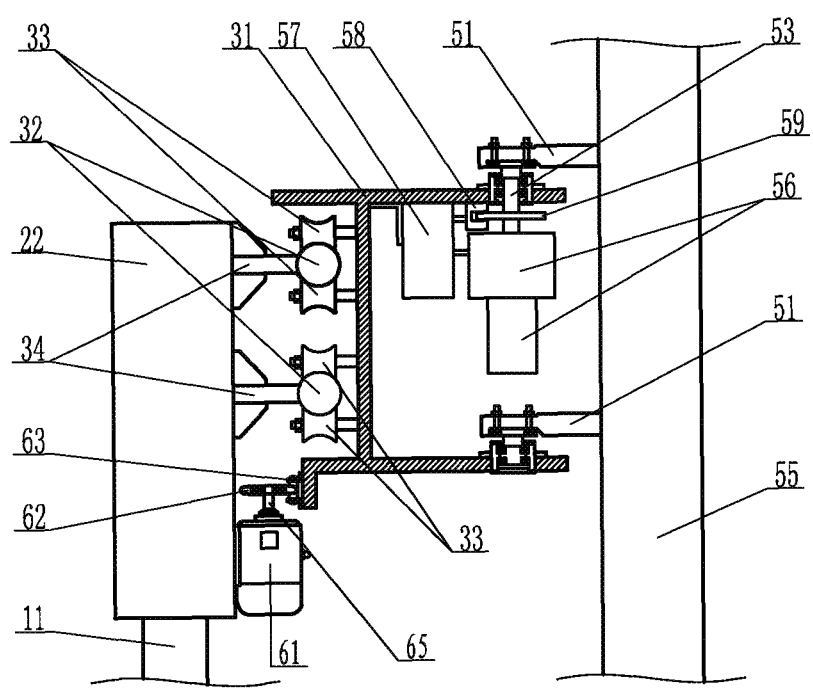
FIG. 3 shows the connection structure of a blade and a trolley in the present invention.

As shown in details in FIG. 3, the trolley 31 is attached to the rails 32 of the circuit frame 22 and capable of moving on the rails 32 of the circuit frame 22 via rollers 33. The rail 32 is connected to the circuit frame 22 through the arms 34, and the rail 32 can be of any kind, e.g., maglev. The plurality of rollers 33 are on the trolley 31. The generator 61 is fixed on the circuit frame 22. The chain 63 may engage the gear 62 that is fixed on the rotor shaft 65 of the generators 61. A plurality of generators 61 are deployed on the circuit frame 22, and the gear 62, engaging with the chain 63 which connecting neighboring trolleys 31, is deployed on top of the generator rotor 65. When the wind drives the trolleys 31, the generators 61 are generating electricity.

Figure 4:
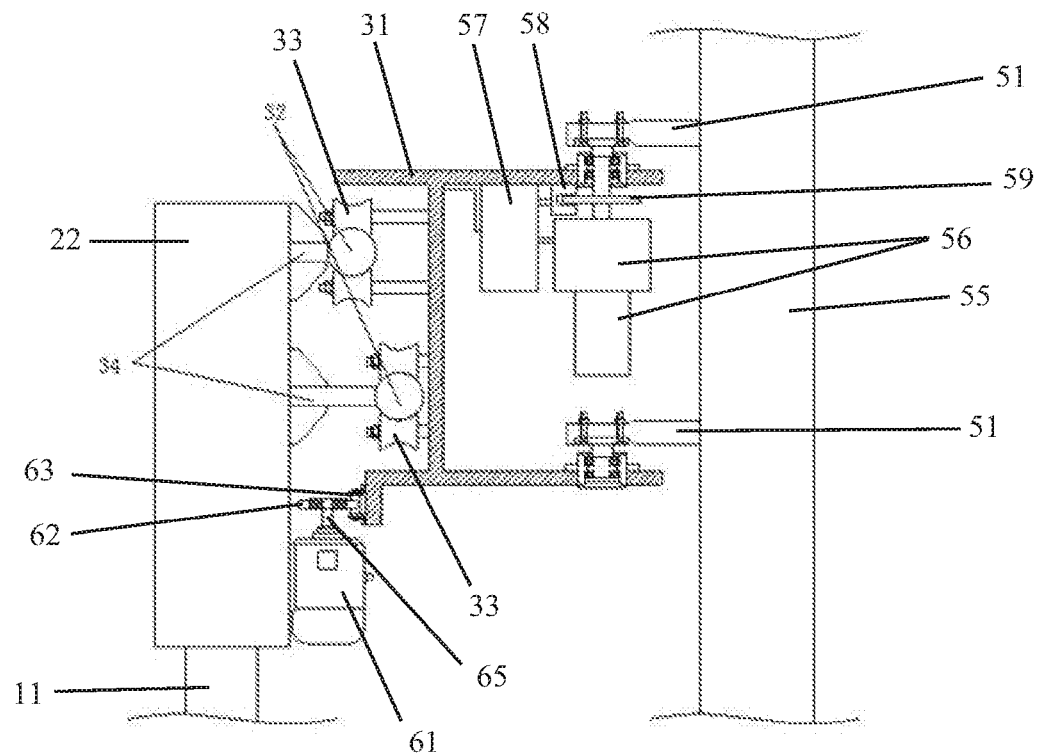
FIG. 4 shows another connection structure of a blade and a trolley in the present invention.
Figure 5:
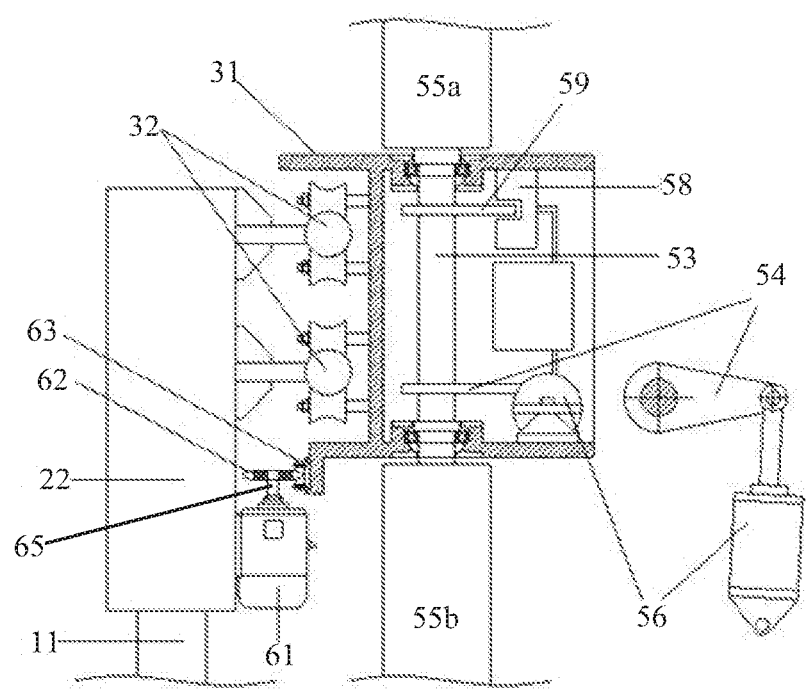
FIG. 5 shows yet another connection structure of a blade and a trolley in the present invention.

As shown in FIGS. 3, 4, and 5, the blade 55 is attached on the trolley 31 with one blade on each trolley, and the rotation angle of the blade is adjustable. The blade may have the section of a symmetric aerofoil, airfoil with a convex surface and a concave surface, or airfoil with a convex surface and a flat surface. The interval between the neighboring trolleys is 2-8 times of the width of the blade. The rotation angle of the blade 55 is adjustable based on the position of the corresponding trolley 31 on the circuit frame 22. After the rotation angle of the blade 55 is adjusted, the blade 55 may be braked by the blade braking device, which comprises a brake caliper 58, braking disc 59, and hydraulic drive system 57. The braking disc 59 may be deployed on the pivot shaft 53.

In one embodiment of the present invention as shown in FIG. 3, the blade 55 is an integrated part 55 and connected to the pivot shafts 53 via the blade arms 51. The wireless servo signal transmission device 72 (shown in FIG. 6) controls the blade 55 to rotate to certain degrees as necessary.

In another embodiment of the present invention as shown in FIG. 4, the two rails 32, i.e., the upper rail and lower rail, are not vertically aligned, and the arrangement enhances the stability of the trolley 31.

In yet another embodiment of the present invention as shown in FIG. 5, the blade 55 is consists of an upper blade 55a and a lower blade 55b, and both blades are connected with the pivot shaft 53. A servo pushing rod 54 is deployed at one end of the pivot shaft 53, controlling the rotation of both upper and lower blades 55a and 55b, and a braking disc 59, used to brake the upper and lower blades 55a and 55b, is deployed at the other end of the pivot shaft 53.

Figure 6:
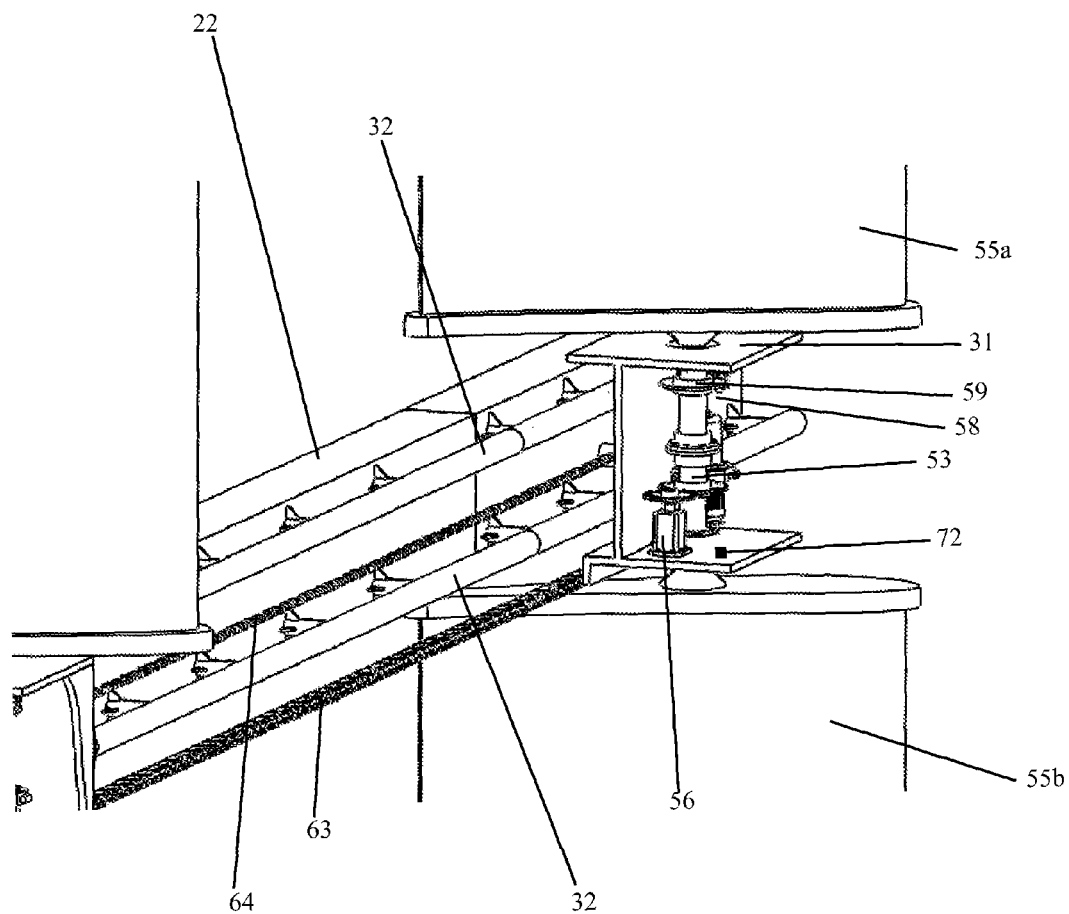
FIG. 6 is the perspective view of connection structure of a blade and a trolley in the present invention.

As shown in FIG. 6, trolleys 31 are connected with each other by steel cable or chain 64. The blade may consist of an upper blade 55a and a lower blade 55b, and the upper blade 55a and the lower blade 55b are connected via a pivot shaft 53. The pivot shaft 53 is able to rotate, thus making the blade rotate. The wireless servo signal transmission device 72 receives signal from the central controller and controls the operation of the blade rotation servo device 56.

Figure 7:
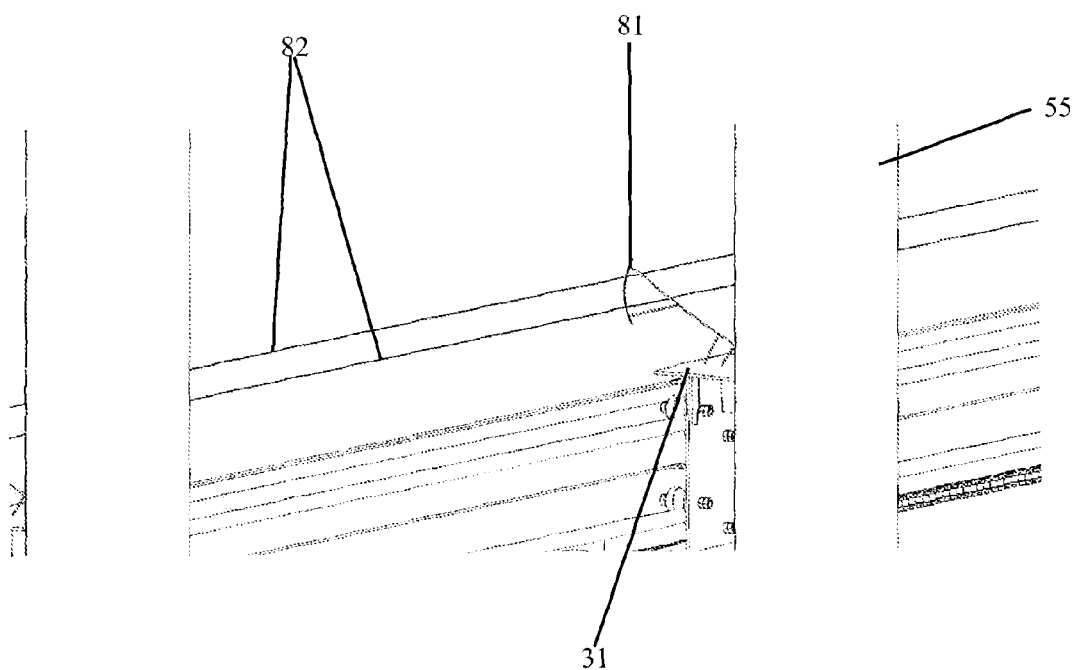
FIG. 7 shows the view of the pantograph or slip ring on the trolley.

As shown in FIG. 7, the current collector 81, which is a pantograph or a slip ring, is deployed on the trolley 31, thereby receiving electricity from the power grid 82. The pantograph or the slip ring 81 may get power from the power grid 82 to power the hydraulic drive system 57 and the wireless servo signal transmission device 72 of the trolley 31.

Figure 8:
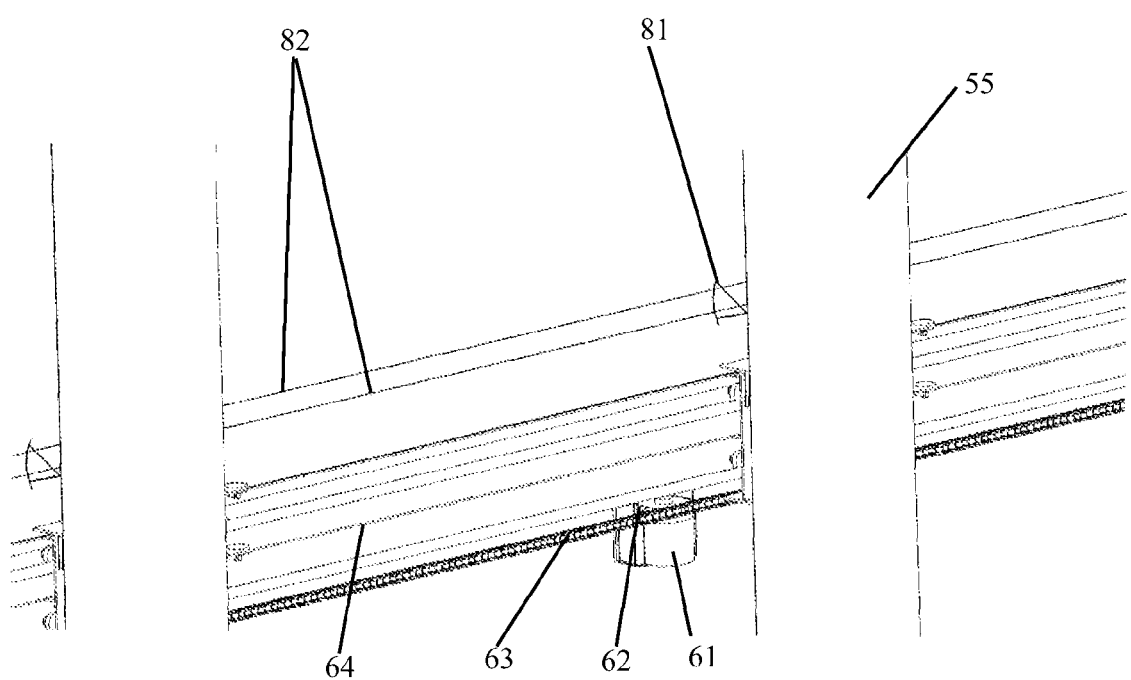
FIG. 8 shows the view of the generator deployed on the circuit frame and engaged with chain.
Figure 9:
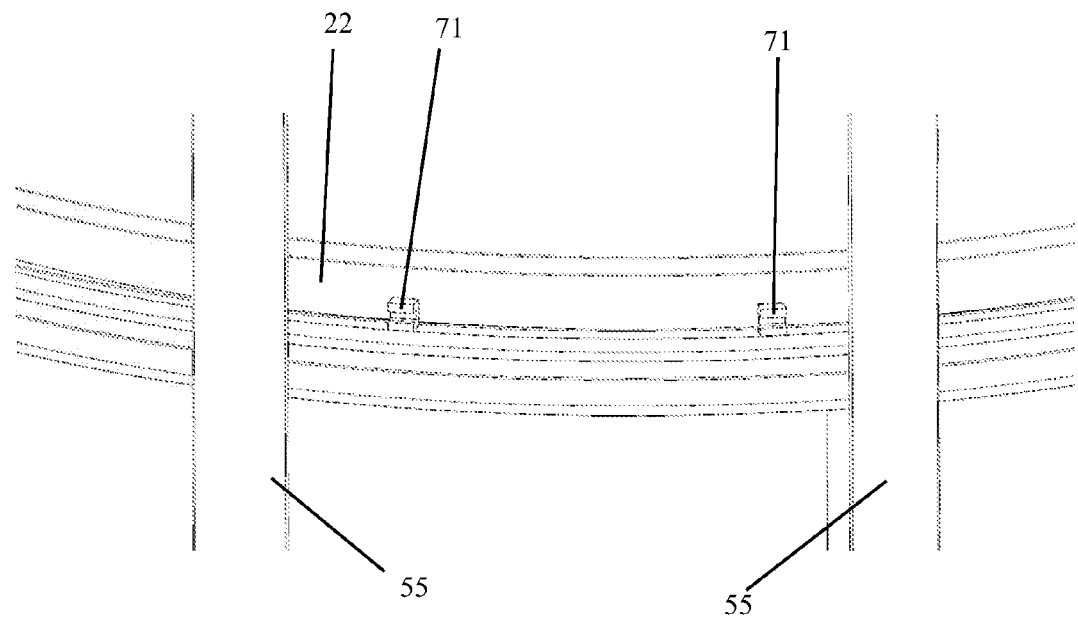
FIG. 9 shows the structure of the positioning devices on the circuit frame.

As shown in FIG. 8, the steel cable 64 for connecting the trolleys is parallel to the chain 63. As shown in FIG. 9, the positioning devices 71 are provided at intervals (e.g., 10 degrees to 20 degrees) on the arc segments of the circuit frame 22. While the trolley 31 passes the positioning devices 71, the positions of trolleys on the arc segments can be determined. Based on the positions of trolleys on the arc segments, an optimal blade rotation angle is decided.

Alternatively, the circuit frame may have two tiers—the upper tier and the lower tier.

Figure 10:
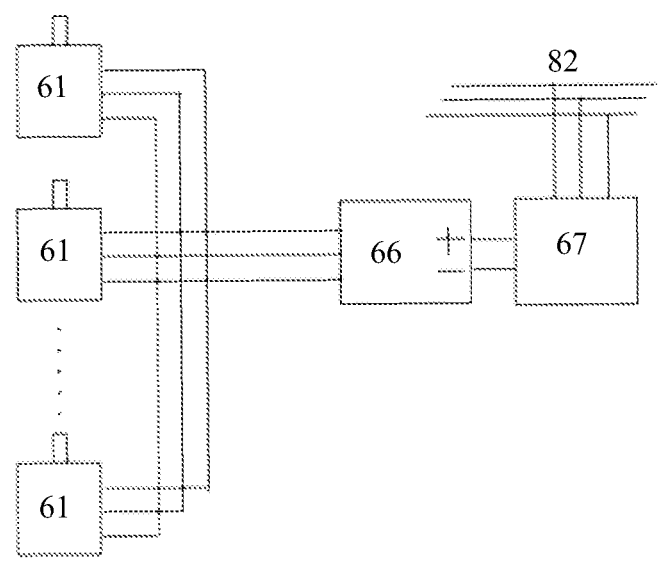
FIG. 10 is a diagram depicting the wiring between the generators and the power grid.

As shown in FIG. 10, the outputs of the generators 61 go to the combiner box 66, where the different AC input, with frequency, voltage, and current being adjusted, become a single DC output, and the combiner box 66 sends the DC output to the inverter 67 and eventually to the power grid 82.

Figure 11A:
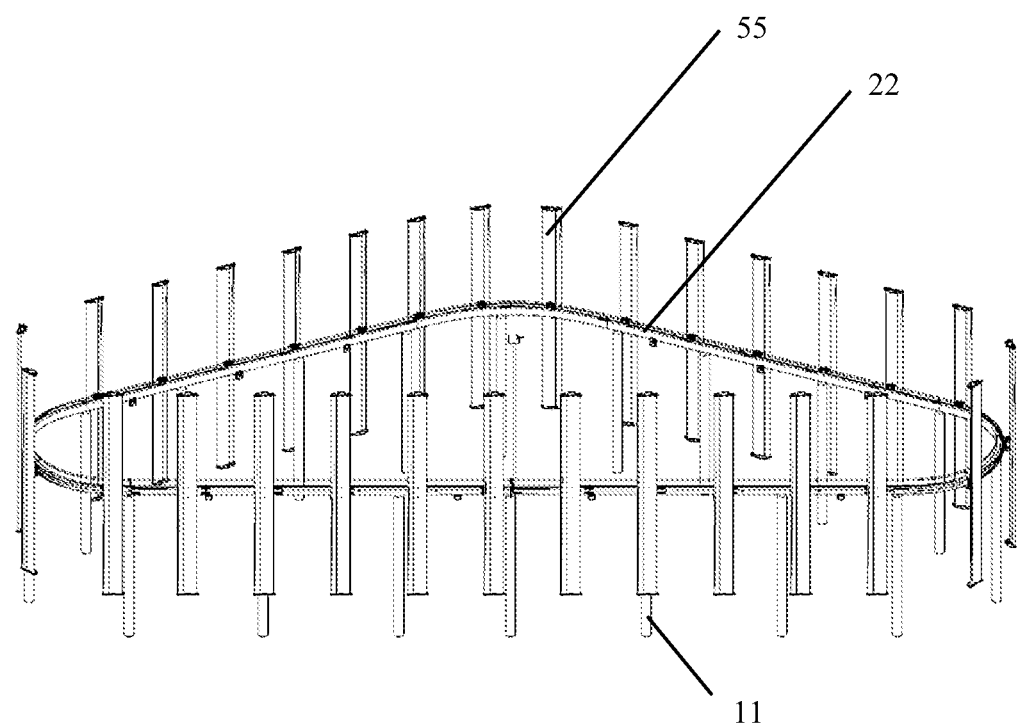
FIG. 11a shows the overall structure of the wind energy system in one embodiment of the present invention where the shape of the circuit frame is polygonal.
Figure 11B:
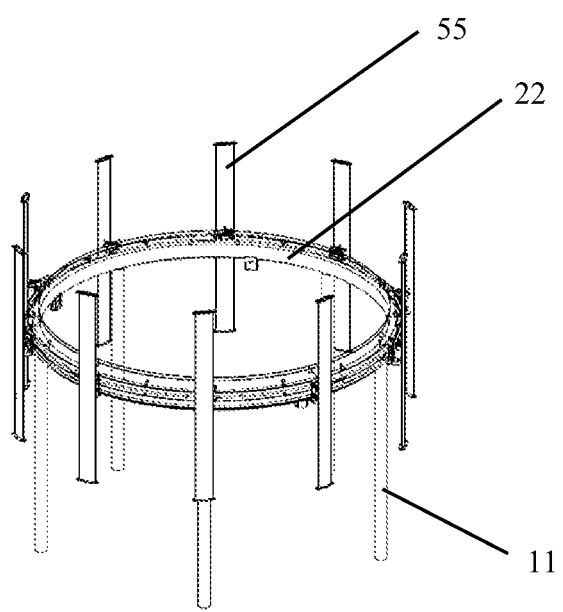
FIG. 11b shows the overall structure of the wind energy system in another embodiment of the present invention where the shape of the circuit frame is round.

The circuit frame 22 may be of a unit module structure, and two unit modules may be connected via plugging. A plurality of modules may form the circuit frame with the designed shape. In one embodiment of the present invention as shown in FIG. 11a, the overall shape of the circuit frame 22 is polygonal. In another embodiment of the present invention as shown in FIG. 11b, the overall shape of the circuit frame 22 is round.

Figure 12:
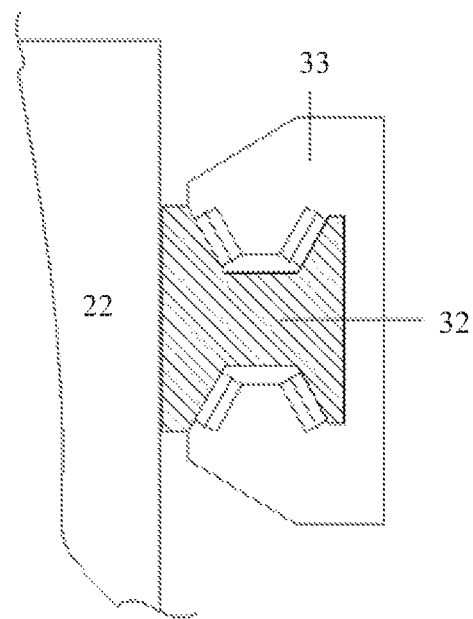
FIG. 12 shows the detailed structure of the rail and the slider in one embodiment of the present invention.
Figure 13:
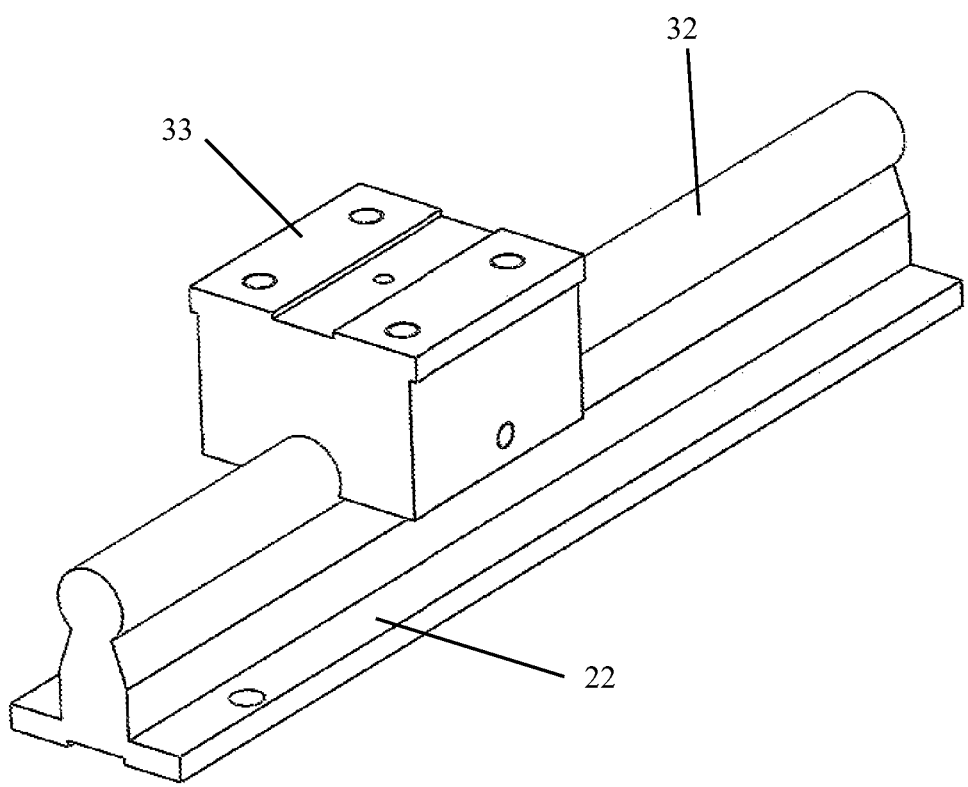
FIG. 13 shows the detailed structure of the rail and the slider in another embodiment of the present invention.
Figure 14:
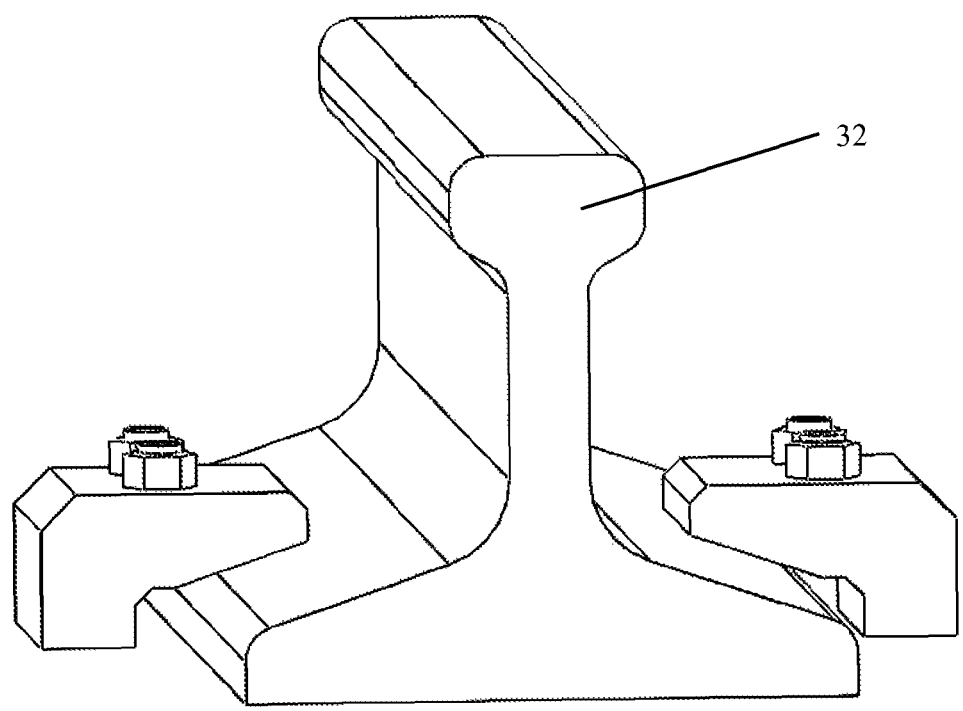
FIG. 14 shows the detailed structure of the rail in yet another embodiment of the present invention.

The trolley 31 is attached to the rails 32 of the circuit frame 22 and capable of moving on the rails 32 of the circuit frame 22 via rollers/sliders 33. In various embodiments of the present invention as shown in FIGS. 12, 13, and 14, rail 32 are in various arrangements in relation to roller/slider 33. FIG. 14 shows another embodiment of the present invention that is like the rail of a train. The roller/slider is not shown in FIG. 14, while the entire H shaped rail 32 is shown in the Figure.

The present invention is further illustrated in the following examples. The examples do not limit the scope of the present invention, as one of skilled in the art may modify the examples without departing from the scope of the present invention.

EXAMPLE 1

Figure 2:
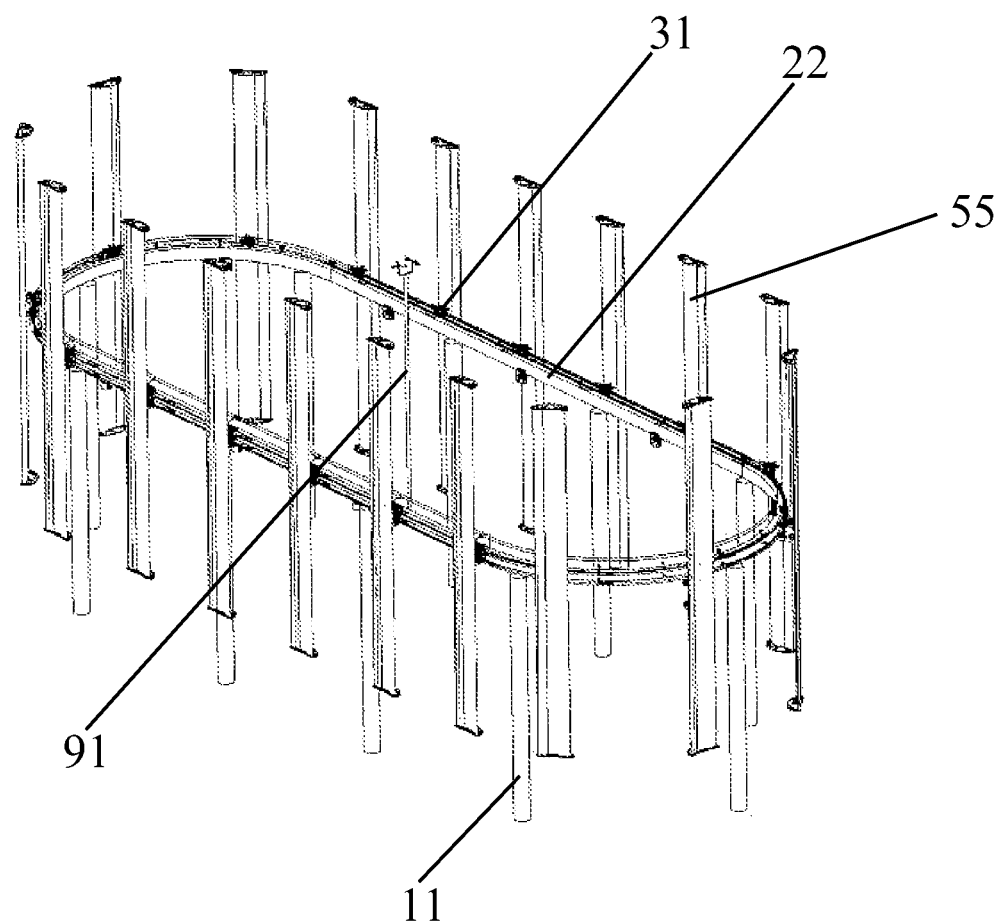
FIG. 2 shows the structure of the wind energy system of Example 1.

The wind power system of the present invention is as shown in FIG. 2. In the circuit frame, each of the straight segments of the circuit frame is 2000 meters long, the radius of the arc segment is 100 meters, and other segments are straight. The straight segment faces the wind. The circuit frame is designed to be 20 meters high, and the blade is 23 meters long in total and 2 meters wide. There are 250 to 350 trolleys in total. The output of the system can reach 40 MW under wind speed of 13 m/s, provided the wind speed is not parallel to the straight segments.

EXAMPLE 2

The overall structure of the wind energy system is as shown in FIG. 11a, where the circuit frame is substantially of the shape of a triangle and its longest side is 2000 meters long. The longest side faces the wind. The circuit frame is designed to be 20 meters high, and the blade is 23 meters long in total and 2 meters wide. There are 250 to 350 trolleys in total. The output of the system can reach 40 MW under wind speed of 13 m/s, provided the wind speed is not parallel to the longest side. The system in Example 2 is the same in structural elements as the system in Example 1, while the length and shape design of the circuit frame differs from that of Example 1.

EXAMPLE 3

The overall structure of the wind energy system is shown in FIG. 11b. The circuit frame is round with a diameter of 2000 meters. The circuit frame is designed to be 20 meters high, and the blade is 23 meters long in total and 2 meters wide. There are 400 to 450 trolleys in total. The output of the system can reach 35 MW under wind speed of 13 m/s. The system in Example 3 is the same in structural elements as the system in Example 1, while the length and shape design of the circuit frame differs from that of Example 1.

EXAMPLE 4

The overall structure of the wind energy system is the same to the one shown in FIG. 11b and Example 3, except that the circuit frame is round with a diameter of 500 meters; the circuit frame is designed to be 20 meters high; the blade is 23 meters long in total and 2 meters wide; and there are 100 to 120 trolleys in total. The output of the system can reach 8 MW under wind speed of 13 m/s. The system in Example 4 is the same in structural elements as the system in Example 1, while the length and shape design of the circuit frame differs from that of Example 1.

I claim:

1. A wind power electricity generating system, comprising
a circuit frame,
towers for supporting the circuit frame,
rails attached to the circuit frame,
trolleys attached to the rails and capable of moving on the rails via rollers or sliders,
blades, each of said blades having adjustable rotation angle and being connected to each of the trolleys, and each of said blades having a hydraulic drive system for adjusting the rotation angle and a blade braking device for braking,
generators each of said generators having a rotor shaft and a gear thereon,
a chain connecting the trolleys and engaging the gears of the generators for driving the rotor shafts of the generators,
positioning devices being deployed at an interval on the circuit frame for sending and receiving signal to determine position of the trolleys passing thereby,
wireless servo signal transmission devices, each of the wireless servo signal transmission devices being deployed at each of the trolleys for sending and receiving signal on the position of the trolleys and controlling the adjustable rotation angle of the blade,
a central controller for receiving the signals on the position of the trolleys from the positioning devices and the wireless servo signal transmission devices and on wind speed and direction, determining the position of the trolleys based on the signals and the adjustable rotation angles for the blades, actively adjusting the rotation angle of the blades and braking the blades by sending signals to the wireless servo signal transmission devices,
current collectors, each of said current collectors being installed on the trolley for collecting power from a power supply and providing the power to the hydraulic drive system of each of the blades and each of the wireless servo signal transmission devices, and
an anemometer and wind vane being deployed at a point along an axis of symmetry of the circuit frame for sending signals on the wind speed and direction to the central controller,
wherein the hydraulic drive system of the blades optionally serves as the blade brake device,
each of the blades is driven by wind and travels with each of the trolleys with adjusted rotation angle along the rail,
the chain connecting the trolleys in turn drives the rotor shafts of the generators to generate power output, and
the adjustment of the rotation angle of the blades and braking of the blades are powered by the power supply provided by the current collector.

2. The wind power electricity generating system of claim 1, wherein the circuit frame is of a unit module structure having two or more modules, and the modules are connected by plugging to form the circuit frame of a designed shape.

3. The wind power electricity generating system of claim 1, wherein the circuit frame comprises arc segments, and the positioning device is deployed on the arc segments of the circuit frame.

4. The wind power electricity generating system of claim 1, wherein each of the generators is fixed on the circuit frame.

5. The wind power electricity generating system of claim 1, wherein the shape of the blade is a symmetric aerofoil, an airfoil with a convex surface and a concave surface, or airfoil with a convex surface and a flat surface.

6. The wind power electricity generating system of claim 1, further comprising
rollers or sliders on the trolley,
wherein the trolley is moveable via the rollers or sliders on the rails.

7. The wind power electricity generating system of claim 1, further comprising
arms for connecting the rails to the circuit frame.

8. The wind power electricity generating system of claim 1, wherein the circuit frame consists of an upper tier and a lower tier.

9. The wind power electricity generating system of claim 1, further comprising
a second chain or steel cable for connecting the trolleys,
wherein the steel cable or the second chain are in parallel with the chain for engaging the gear on the generators for driving the generators.

10. The wind power electricity generating system of claim 1, wherein an interval between neighboring trolleys is 2-8 times of a width of the blade.

11. The wind power electricity generating system of claim 1, further comprising
a blade braking device for braking the blade, said blade braking device comprising
a brake caliper, a braking disc, and
a hydraulic drive system.

12. The wind power electricity generating system of claim 1, wherein the blade consists of an upper blade and a lower blade.

13. The wind power electricity generating system of claim 12, further comprising
a pivot shaft, and
a blade braking device for braking the upper blade and the lower blade, said blade braking device comprising
a brake caliper,
a braking disc, and
a hydraulic drive system,
wherein the upper blade and the lower blade are connected by the pivot shaft; and the pivot shaft is rotatable to make the upper blade and the lower blade rotate; and the braking disc is deployed on the pivot shaft for braking the upper blade and the lower blade.

14. The wind power electricity generating system of claim 1, wherein the current collectors are pantographs or slip rings on the trolley for receiving electricity.

15. The wind power electricity generating system of claim 1, wherein the anemometer and wind vane is deployed at a point along an axis of symmetry of the circuit frame.

16. The wind power electricity generating system of claim 1,
wherein the central controller actively adjusts the rotation angle of the blade and brakes the blade based on the blade's position on the circuit frame, wind speed and direction, and generator output.

17. The wind power electricity generating system of claim 1, further comprising
a combiner box, and
an inverter,
wherein outputs of the generators go to the combiner box, with frequency, voltage and current being adjusted, and become a single DC, the combiner box sends the single DC to the inverter, and the inverter sends out power to a power grid.

18. A method for generating wind power using the electricity generating device of claim 1, comprising
determining positions of the trolleys on the circuit frame by the positioning devices,
determining an optimal rotation angle of the blades based on the positions of the trolleys,
identifying the wind speed and direction,
actively adjusting the rotation angle of the blades based on the optimal rotation angle based on the circuit frame, wind speed and direction, and generator output, and
braking the blades by the blade braking device when the blade rotation angle is at the optimal rotation angle.

19. The method for generating wind power according to claim 18, further comprising
sending outputs of the generators to the combiner box,
adjusting the outputs of the generator to become a single DC in the combiner box, and
sending the single DC from the combiner box to the inverter.

20. The method for generating wind power according to claim 17, further comprising
receiving electricity from a power grid by the current collectors, and
sending the electricity to power the hydraulic drive system and the wireless servo signal transmission devices of the trolley.

* * * * *